United States Patent
Xu et al.

(10) Patent No.: US 11,604,172 B2
(45) Date of Patent: Mar. 14, 2023

(54) ULTRASONIC MONITORING PROBE FOR INTERNAL SERVICE STRESS OF A MARINE STRUCTURAL COMPONENT

(71) Applicant: BEIJING INSTITUTE OF TECHNOLOGY, Beijing (CN)

(72) Inventors: Chunguang Xu, Beijing (CN); Shuangyi Li, Beijing (CN); Yuren Lu, Beijing (CN); Peng Yin, Beijing (CN); Dezhi Li, Beijing (CN); Wenyuan Song, Beijing (CN)

(73) Assignee: BEIJING INSTITUTE OF TECHNOLOGY, Beijing (CN)

( * ) Notice: Subject to any disclaimer, the term of this patent is extended or adjusted under 35 U.S.C. 154(b) by 14 days.

(21) Appl. No.: 17/329,585

(22) Filed: May 25, 2021

(65) Prior Publication Data
US 2021/0382014 A1     Dec. 9, 2021

(30) Foreign Application Priority Data
Jun. 5, 2020   (CN) .......................... 202010506908.5

(51) Int. Cl.
G01N 29/24     (2006.01)
G01N 29/28     (2006.01)

(52) U.S. Cl.
CPC ......... *G01N 29/2437* (2013.01); *G01N 29/28* (2013.01); *G01N 2291/106* (2013.01)

(58) Field of Classification Search
CPC ............... G01N 29/2437; G01N 29/28; G01N 2291/106
See application file for complete search history.

(56) References Cited

U.S. PATENT DOCUMENTS

| | | | | |
|---|---|---|---|---|
| 3,760,634 | A * | 9/1973 | Birks | G01N 29/28 73/644 |
| 5,179,970 | A * | 1/1993 | Jarocki | B67D 1/12 251/129.08 |
| 2006/0178847 | A1* | 8/2006 | Glancy | A01G 25/167 702/62 |

FOREIGN PATENT DOCUMENTS

| | | | |
|---|---|---|---|
| CN | 103017952 A | * | 4/2013 |
| CN | 103017952 A | | 4/2013 |
| CN | 103018325 A | | 4/2013 |
| CN | 204301923 U | | 4/2015 |

(Continued)

*Primary Examiner* — Tarun Sinha
(74) *Attorney, Agent, or Firm* — John A. Miller; Shumaker, Loop & Kendrick, LLP

(57) ABSTRACT

An ultrasonic monitoring probe for internal service stress of a marine structural component. The probe includes a detection wedge provided with two symmetrically arranged inclined surfaces at its top, two connecting channels vertical to the two inclined surfaces and penetrating through the detection wedge and provided with threaded holes close to the inclined surfaces and water storage cavities far away from the inclined surfaces, two ultrasonic transducers mounted in the threaded holes of the two connecting channels and configured for generating and receiving ultrasonic waves; two bottom rings located at a bottom of the detection wedge and arranged relative to the water storage cavities and configured for attachment to a surface of a detected component, a magnet disposed in a magnet placement hole arranged at a central position between the two connecting passages, and a monitoring device electrically connected with the two ultrasonic transducers.

4 Claims, 2 Drawing Sheets

(56) References Cited

FOREIGN PATENT DOCUMENTS

| | | | |
|---|---|---|---|
| CN | 105823582 | A | 8/2016 |
| CN | 105910742 | A | 8/2016 |
| CN | 108271409 | A | 7/2018 |
| CN | 209927332 | U | 1/2020 |
| JP | 2010236892 | A | 10/2010 |
| WO | 8605272 | A1 | 9/1986 |

* cited by examiner

ULTRASONIC MONITORING PROBE FOR INTERNAL SERVICE STRESS OF A MARINE STRUCTURAL COMPONENT

CROSS-REFERENCE TO RELATED APPLICATIONS

This application claims priority to China Patent Application Serial No. 202010506908.5 filed Jun. 5, 2020, the entire disclosure of which is herein incorporated by reference.

BACKGROUND

Field

The present disclosure relates to the technical field of research on internal service stress of an underwater detected component, and in particular to an ultrasonic monitoring probe for internal service stress of a marine structural component, which is mainly used for detecting the internal service stress of the structural component in an underwater environment.

Discussion of the Related Art

Common marine structural components such as offshore platforms, submarine pipewires and the like are usually formed by welding steel pipes and steel plates. Welding heat may lead to uneven temperature change, phase change and plastic deformation on the steel material, which in turn form service stress of the structure, and in particular the welding tensile service stress. Said service stress causes local stress concentration of the structure, dislocation and microcrack of material lattices, deformation and cracking of the component and reduction of material fracture strength, so that potential safety hazards are buried for production operation of marine structures. In addition, the marine structure bears external loads such as wind, wave force, ice and snow, seawater corrosion, earthquake, microorganism, and dynamic load during operation, and the combined action of these loads may cause the structure to generate local deformation and fatigue damage. The severe plastic deformation and fatigue damage may cause structural cracks and even sudden structural failure and likes, resulting in catastrophic casualties and property loss. Therefore, there is a need for long-term monitoring for the service stress of the marine structural component.

Compared with other nondestructive testing methods, ultrasonic testing has the characteristics of strong penetrability, wide application range, high sensitivity and the like, and the coupling of the ultrasonic testing is divided into contact method and liquid immersion method. The contact method uses glycerin, engine oil and the like as couplants. Considering the underwater inspection environment of marine structural component, it is more suitable to adopt the liquid immersion method for coupling.

A patent with the patent publication number CN209927332U discloses a broadband variable-angle transmit-receive ultrasonic probe for measuring service stress, wherein a wedge is made of plastic, on two sides of the wedge two arc surfaces are provided, and a fixing rod is used to fix the receive probe and the transmit probe on the two arc surfaces respectively, thereby realizing the design of variable angles. This design of the detection probe cannot be applied to an underwater detection environment, and there are few detection probes designed for the underwater environment. For these reasons, there is a need to redesign a probe for stress detection in the underwater environment.

SUMMARY

Based on the defects of the prior art, a main objective of the present disclosure is to provide an ultrasonic monitoring probe for internal service stress of a marine structural component, so as to realize the purpose of long-term monitoring of the internal service stress of the structure in the underwater environment.

The solution adopted by the present disclosure is an ultrasonic monitoring probe for internal service stress of an marine structural component, which is positioned in an underwater environment and which comprises: a detection wedge provided with two symmetrically arranged inclined surfaces at its top; two connecting channels respectively vertical to the two inclined surfaces and penetrating through the detection wedge and provided with threaded holes close to the inclined surfaces and water storage cavities far away from the inclined surfaces; two ultrasonic transducers respectively mounted in the threaded holes of the two connecting channels and configured for generating and receiving ultrasonic waves; two bottom rings located at a bottom of the detection wedge and respectively arranged relative to the water storage cavities and configured for attachment to a surface of a detected component; a magnet disposed in a magnet placement hole arranged at a central position between the two connecting passages and configured for attracting a surface of the detected component; and a monitoring device electrically connected with the two ultrasonic transducers and configured for obtaining and monitoring a value of the service stress of the detected component.

As stated above, the surface of the structure to be detected and the transducer are coupled by taking water as a couplant, so that the long-term and stable ultrasonic detection and monitoring are ensured, the internal service stress of a component can be detected underwater, and the long-term monitoring of the internal service stress of the structure in the underwater environment is realized.

Furthermore, two side surfaces of the detection wedge are provided with communicating holes communicated with the water storage cavities.

As stated above, the internal water pressure of the detection wedge is kept constant with the pressure of the external environment, and the influence on the detection result is reduced.

Optionally, the bottom rings are each provided with gaps at intervals along its circumference, and the gaps make each of the bottom ring to form an unclosed ring; the communicating holes and the unclosed rings jointly communicate the water storage cavities and external environment, so that water pressure in the water storage cavities is consistent with the water pressure outside the detection wedge.

As stated above, the communicating holes and the bottom rings jointly communicate the water storage cavities in the detection wedge and external environment, to ensure that there is no water pressure difference between the inside of the detection wedge and the external environment, and the accuracy of monitoring is improved.

Optionally, chip protection films are arranged on contact surfaces of the ultrasonic transducers and the water storage cavities and configured for protecting piezoelectric chips of the ultrasonic transducers from influence of water pressure and seawater corrosion during the detection.

Furthermore, the ultrasonic transducers and the monitoring device are connected by waterproof treated transducer connecting wires.

As stated above, each component is ensured to be used stably and to be suitable for detecting the internal service stress of a structural component in an underwater environment, and long-term and stable ultrasonic testing and monitoring are guaranteed.

Furthermore, the detection wedge is a polymethyl methacrylate wedge.

By the above, the polymethyl methacrylate wedge meets the requirement of velocity of the transmitting ultrasonic longitudinal waves, the detection effect is good, and the cost is low.

The ultrasonic monitoring probe for internal service stress of the marine structural component according to the present disclosure is mainly used for detecting the internal service stress of a component in an underwater environment. The ultrasonic monitoring probe can adapt to an underwater detection environment, solves the problem that the detection is influenced by underwater pressure. The ultrasonic monitoring probe uses water as the couplant, which can solve the problem that a common colloidal solid couplant cannot be applied to the underwater environment, so as to meet the long-term monitoring requirements for the internal service stress of the structure in the underwater environment.

The foregoing description is only an overview of the technical solutions of the present disclosure, and in order to be able to understand the technical means of the present disclosure more clearly, the present disclosure may be implemented in accordance with the content of the description, and in order to make the above and other objects, features, and advantages of the present invention more obvious and understandable, the following detailed description is given with reference to the preferred embodiments in conjunction with the accompanying drawings.

BRIEF DESCRIPTION OF THE DRAWINGS

To more clearly illustrate the technical solutions of the embodiments of the present disclosure, the drawings of the embodiments will be briefly described below.

DETAILED DESCRIPTION OF THE EMBODIMENTS

Figure 1:
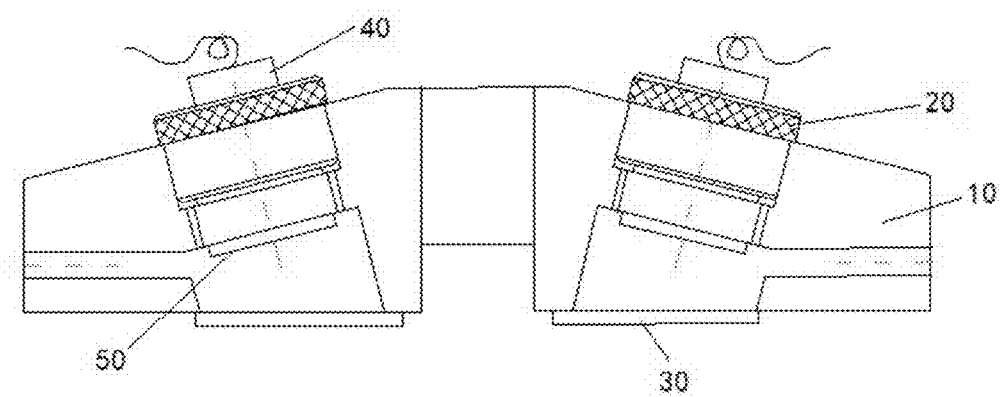
FIG. 1 is a schematic structural diagram of an ultrasonic monitoring probe for internal service stress of a marine structural component according to the present disclosure.

The specific embodiments of the present disclosure, which as a component of this specification illustrate the principles of the present disclosure by way of examples, will be described in detail below with reference to the referenced drawings, other aspects, features and advantages of the present disclosure will become apparent from the following detailed description. In the referenced drawings, identical or similar elements in different drawings are designated with identical reference numerals.

Figure 2:
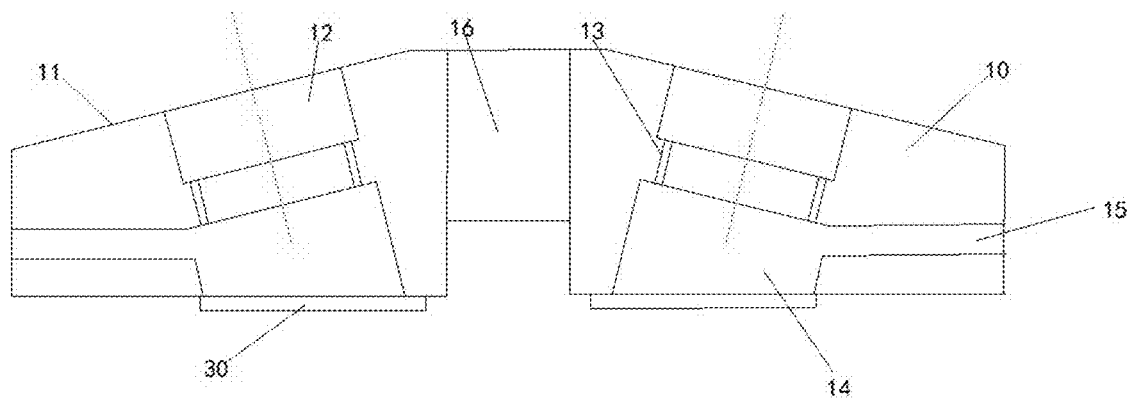
FIG. 2 is a schematic structural diagram of a polymethyl methacrylate wedge of the ultrasonic monitoring probe for internal service stress of a marine structural component according to the present disclosure.
Figure 3:
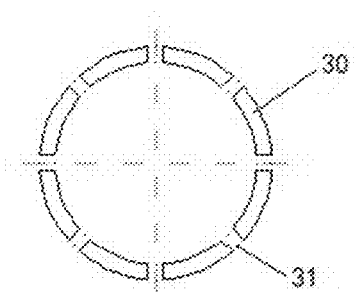
FIG. 3 is a schematic structural diagram of a bottom ring of the present disclosure.
Figure 4:
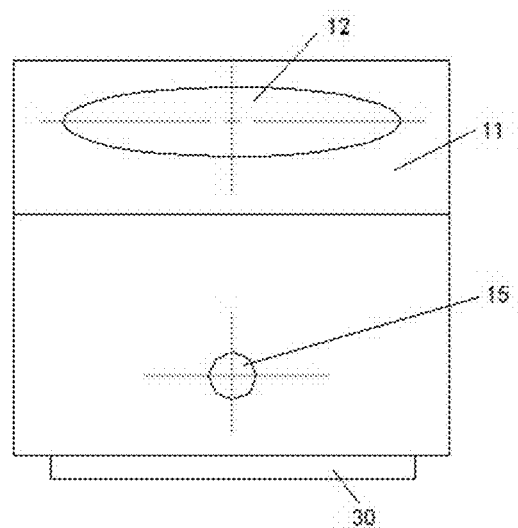
FIG. 4 is a side view of FIG. 1.
Figure 5:
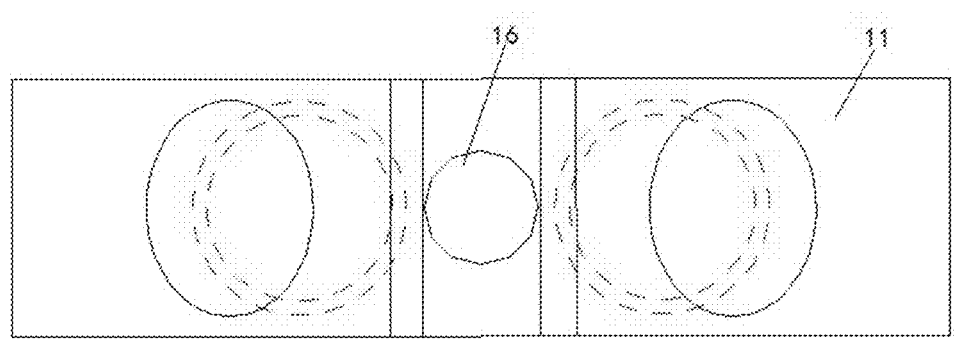
FIG. 5 is a top view of FIG. 1.

The present disclosure provides an ultrasonic monitoring probe for monitoring the service stress of the detected component in an underwater environment to perform an ultrasonic detection for the service stress of a marine structural component. The ultrasonic monitoring probe is mainly used for detecting the service stress of the underwater component so as to realize the purpose of long-term monitoring for the service stress of the component in an underwater environment. As shown in FIGS. 1 to 5, the ultrasonic monitoring probe for internal service stress of the marine structural component of the present disclosure mainly comprises a detection wedge 10, waterproof ultrasonic transducers 20 and transducer connecting wires 40. The detection wedge 10, the ultrasonic transducers 20 and the transducer connecting wires 40 of the present disclosure are subjected to corrosion protection treatment to be adapted to the long-term underwater monitoring environment.

The detected component is an underwater marine structural component, and the service stress of the detected component may arise by dynamic load, corrosion, wave force and the like in service. The structure of the detected component may be damaged by an exceeding service stress.

Monitoring ultrasonic waves are generated by the ultrasonic transducers 20. The transducer connecting wires 40 are used for connecting the ultrasonic transducers 20 to a monitoring equipment so as to obtain a value of the service stress of the detected component. The ultrasonic monitoring probe for the service stress of the marine structural component is tightly pressed in a monitored area, so that ultrasonic waves can be incident on the monitored area at an angle at which the detection wedge 10 is fixed. A top of the detection wedge 10 is provided with two inclined surfaces 11, which are symmetrically arranged. Two connecting channels 12 are arranged to penetrate through the detection wedge 10 and are configured to be respectively perpendicular to the two inclined surfaces 11. Each of the connecting channels 12 comprises a threaded hole 13 close to the inclined surface 11 and a water storage cavity 14 far away from the inclined surface 11. Two ultrasonic transducers 20 are respectively mounted in the threaded holes of the two connecting channels 12. The connection between the ultrasonic transducers 20 and the connecting channels 12 may be any one of fastening connection means such as bonding, bolting, riveting, and the likes, so long as the ultrasonic transducers 20 can be fixed in the connecting channels 12.

During the detection, possible pressure of water used for coupling inside the wedge influences the final detection result. In order to ensure that there is no pressure difference between the water in the detection wedge 10 and the external environment, the detection wedge 10 is provided with communicating holes 15 on its side surfaces and unclosed rings at the bottom. The bottom rings 30 are arranged at the bottom of the detection wedge 10 and each of the bottom rings 30 is opposite to the water storage cavity 14. Gaps 31 are arranged on each of the bottom rings 30 at intervals along the circumference direction of the bottom rings 30, and the gaps 31 make each of the bottom rings 30 to form an unclosed ring.

The ultrasonic monitoring probe, which is used as a device that generates and receives ultrasonic waves, is an important part of the ultrasonic testing system. The ultrasonic monitoring probe according to the present disclosure mainly includes the detection wedge 10 and the ultrasonic transducers 20. On the detection wedge 10 a position (magnet placing hole 16) for placing a magnet is provided, so that the probe can be conveniently fixed at a detected position for a long time during the detection, thereby ensuring effective detection and the accuracy of detection data.

The principle of the ultrasonic transducers 20 is to convert other forms of energy into ultrasonic vibration energy. For example, a piezoelectric transducer, which is one of the most common transducers in ultrasonic testing, converts electric energy into acoustic energy and then converts acoustic energy into electric energy. The ultrasonic transducer is a device that converts input electrical energy power into mechanical energy power (namely the ultrasonic waves) and then transmits the mechanical energy power with a small fraction of power consumption. One of the ultrasonic transducers 20 according to the present disclosure is used for sending ultrasonic longitudinal waves, and the other one of the ultrasonic transducers 20 is used for receiving ultrasonic critical refracted longitudinal waves. Through the transducer connecting wires 40 the two ultrasonic transducers 20 are electrically connected with the monitoring equipment, which receives sound wave signals to calculate the value of the service stress.

The piezoelectric chips of the ultrasonic transducers 20 are elements for sending and receiving ultrasonic waves by piezoelectric effect. As the most important component in the probe, the piezoelectric chips are protected by chip protective films 50 from influence of pressure and seawater corrosion during the detection. For this reason, the chip protective films 50 according to the present disclosure are different from the common surface contact type ultrasonic transducer in that each of the chip protective films 50 is arranged on a contact surface of one of the ultrasonic transducers and one of the water storage cavities. The chip protective films 50 are liquid-coupling films resistant to seawater and hydraulic pressure. In order to operate in the underwater environment where water is used a couplant, the ultrasonic transducers are necessary to adopt water coupled transducers and the transducers and connecting wires of the transducer are subjected to a waterproof treatment, so that the probe can operate normally and stably for a long time underwater and prevent seawater corrosion.

According to Snell's law, in the monitoring probe according to the embodiment of the present application, one of the transducers emits ultrasonic longitudinal waves, which pass through the detection wedge 10 and one of the water storage cavities at an oblique angle θ (i.e., a first critical angle θ) and are incident on the surface and inside of the detected component to generate ultrasonic critical refracted longitudinal waves that pass through the other of the water storage cavities and the detection wedge 10 and are received by the other of the transducers. According to the principle of acoustic elasticity, the propagation velocity of the ultrasonic longitudinal waves is affected by the service stress of the detected component. When the direction of the service stress is in constant with that of the ultrasonic longitudinal waves, the tensile stress will slow down the propagation velocity v of the ultrasonic longitudinal waves or prolong the propagation time t of the ultrasonic longitudinal waves, and the compression stress will accelerate the propagation velocity v of the ultrasonic longitudinal waves or shorten the propagation time t of the ultrasonic longitudinal waves. In view of this, in the case where the distance between the two transducers is kept constant, the propagation time t0 of the ultrasonic waves in a component with zero stress is measured first, the propagation time t of the ultrasonic waves in the detected component is then measured, and the service stress σ of the detected component can finally be calculated according to the difference between the two propagation times, wherein the corresponding calculation formula is as follow:

$$\sigma - \sigma 0 = K(t - t0),$$

wherein, σ is the value of the service stress of the detected component; σ0 is the value of the stress of the component with zero stress, i.e., σ0 is 0; t is the propagation time of the ultrasonic waves in the detected component; t0 is the propagation time of the ultrasonic waves in the component with zero stress, and K is stress coefficient, which is related to the material of the detected component and the distance between the two ultrasonic transducers 20, and can be obtained by calibration of tensile tests.

The component with zero stress is made of a material with the same metallographic structure state and surface roughness as those of the detected component. The propagation time t0 of the ultrasonic waves in the component with zero stress can be obtained through an ultrasonic recording detector. The monitoring device mentioned in the foregoing embodiment is designed based on the above principle, and the value of the service stress of each of positions of the detected component can be obtained by inputting the propagation time t0 of the ultrasonic waves in the component with zero stress into the monitoring device.

Because the detection wedge 10 is required to be made of a material of which transmission velocity of ultrasonic longitudinal waves is lower than that of an underwater marine structural component, and because the marine underwater structural component where non-destructive testing of the service stress of the detected component needs to be performed is mostly a steel or alloy rod piece, the detection wedge 10 may be made of polymethyl methacrylate which meets the requirement of the above transmission velocity of ultrasonic longitudinal waves, taking advantage of polymethyl methacrylate's workability, yield strength, toughness and cost. The stress detecting process, which adopts the detection wedge 10 made of material of polymethyl methacrylate and is based on a critical refraction longitudinal wave method, requires the probe to be fixed at a proper angle, and requires water serving as a couplant to be coupled with the surface of the detected component and the transducers, so that the long-term stability of ultrasonic detection and monitoring is ensured.

Before monitoring, the probe according to the present disclosure is fixed at a detected position, and the magnet placing hole 16 for placing an adsorption magnet is arranged at the central position of the detection wedge 10 to attach the detection wedge 10 to the surface of the detected component. The ultrasonic transducers 20 are fixed on the detection wedge 10 through the threaded holes of the connecting channels 12 so that the ultrasonic waves are incident at a constant angle calculated according to the Snell's law based on the critical refracted longitudinal wave detection method during the detection. The bottom ring regions located at the bottom of the detection wedge 10 are the regions where ultrasonic waves are incident and exit. The rings are designed to be unclosed so that water as the couplant, can flow smoothly during the monitoring. And during the installation, the design of the unclosed bottom rings and the communicating holes 15 on the sides of the water storage cavities 14 ensure that the water pressure in the water storage cavities 14 of the detection wedge 10 and the water pressure outside of the detection wedge 10 are constant, otherwise the accuracy of testing result may be influenced.

In the present disclosure, the ultrasonic transducers are fixed on the polymethyl methacrylate wedge 10 by the threads on the ultrasonic transducers 20, and the polymethyl methacrylate wedge 10 equipped with the ultrasonic transducers 20 is placed in an underwater detection environment. The bottom rings 30 are pressed tightly to the surface of the detected component, which attracts the magnet placed in the magnet placing hole 16. The communicating holes 15 and bottom ring through holes are configured to connect the water storage cavities 14 to the external environment, which ensure that there is no pressure difference between the water storage cavities and the external environment. The ultrasonic monitoring probe is connected with the detecting device through the transducer connecting wires 40 to obtain monitoring data. Each of the chip protective films 50 is located on the contact surface of one of the ultrasonic transducers and the couplant water, and is made of seawater-resistant and hydraulic-resistant materials, so that the stable use of the transducers is guaranteed.

The detection wedge 10 provided by the present disclosure is suitable for monitoring a planar component, and is also suitable for the detected component with a curvature so long as the bottom ring 30 is manufactured to have the curvature compatible with the surface of the detected component so as to ensure that it can be fitted to the surface.

The above are only the preferred embodiments of the present disclosure, and the scope of rights of the present disclosure should not be limited by this. It should be pointed out that a person skilled in the art may make many other improvements and changes without departing from the principle of the present disclosure, and the improvements and changes also should be regarded as falling within the protection scope of the present disclosure.

What is claimed is:

1. An ultrasonic monitoring probe for internal service stress of a marine structural component, which is located in an underwater environment, comprising:
   a detection wedge provided with two symmetrically arranged inclined surfaces at its top;
   two connecting channels respectively vertical to the two inclined surfaces and penetrating through the detection wedge and provided with threaded holes close to the inclined surfaces and water storage cavities far away from the inclined surfaces, wherein two side surfaces of the detection wedge are provided with communicating holes in communication with the water storage cavities;
   two ultrasonic transducers respectively mounted in the threaded holes of the two connecting channels and configured for generating and receiving ultrasonic waves;
   two bottom rings located at a bottom of the detection wedge and respectively arranged relative to the water storage cavities and configured for attachment to a surface of a detected component, wherein the bottom rings are each provided with gaps at intervals along its circumference, and the gaps make each of the bottom rings form an unclosed ring, and wherein the communicating holes and the unclosed rings jointly communicate with the water storage cavities and the external environment, so that water pressure in the water storage cavities is consistent with the water pressure outside of the detection wedge;
   a magnet disposed in a magnet placement hole arranged at a central position between the two connecting passages and configured for attracting a surface of the detected component; and
   a monitoring device electrically connected with the two ultrasonic transducers and configured for obtaining and monitoring a value of the service stress of the detected component.

2. The ultrasonic monitoring probe for internal service stress of the marine structural component of claim 1, wherein chip protection films are arranged on contact surfaces of the ultrasonic transducers and the water storage cavities and configured for protecting piezoelectric chips of the ultrasonic transducers from influence of water pressure and seawater corrosion during the detection.

3. The ultrasonic monitoring probe for internal service stress of the marine structural component of claim 1, wherein the ultrasonic transducers and the device equipment are connected by waterproof treated transducer connecting wires.

4. The ultrasonic monitoring probe for internal service stress of the marine structural component of claim 1, wherein the detection wedge is a polymethyl methacrylate wedge.

\* \* \* \* \*